Aug. 31, 1937.   J. H. WEBB   2,091,745
VALVE
Filed March 23, 1936   2 Sheets-Sheet 1
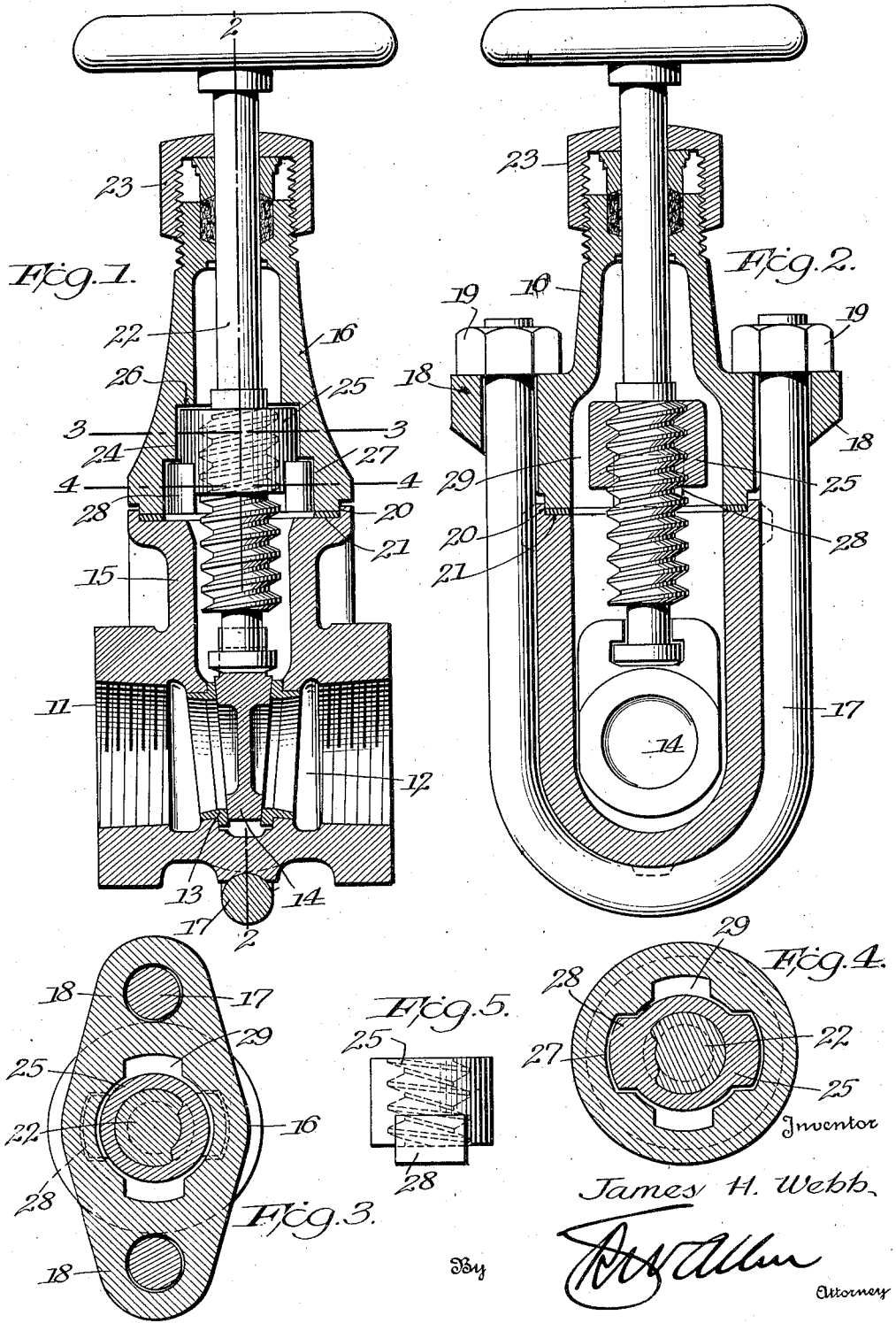
Inventor
James H. Webb
By [signature]
Attorney Aug. 31, 1937. J. H. WEBB 2,091,745
VALVE
Filed March 23, 1936 2 Sheets-Sheet 2
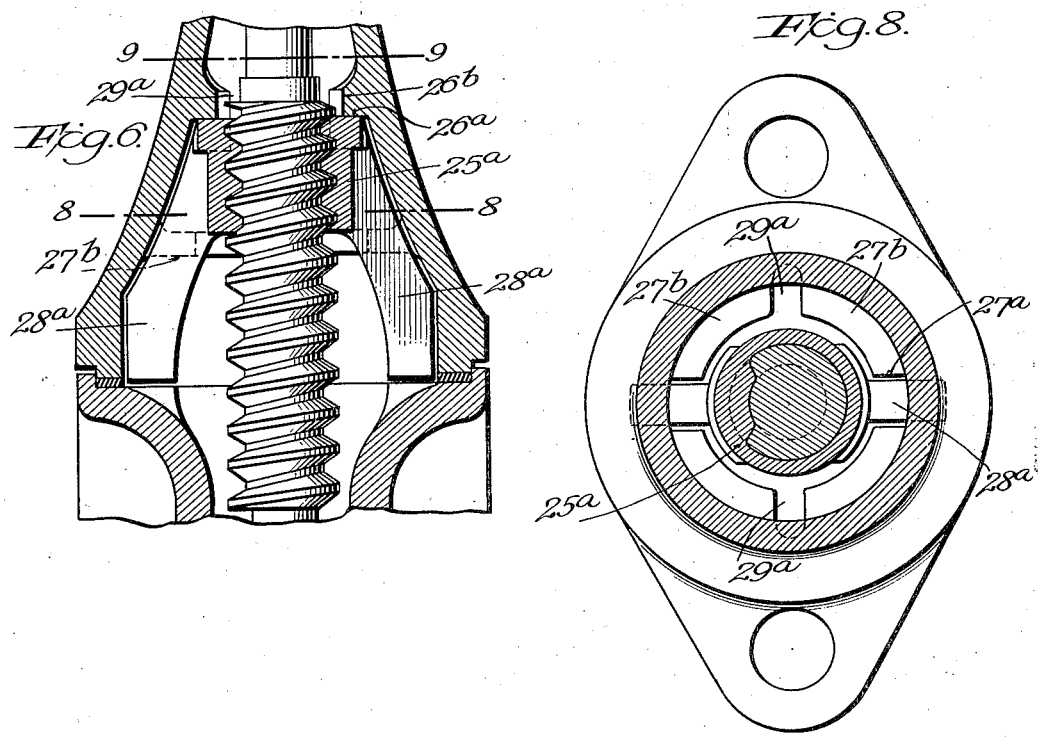
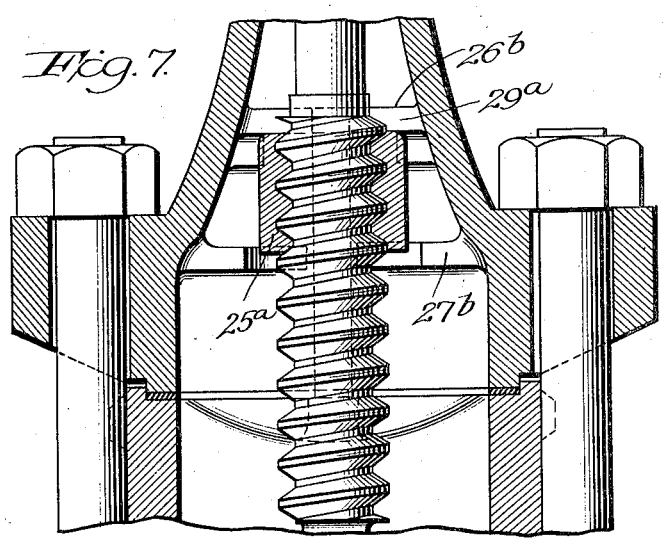
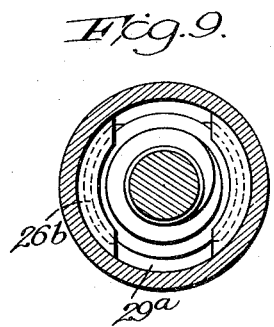
Inventor
James H. Webb.

Patented Aug. 31, 1937

2,091,745

UNITED STATES PATENT OFFICE 2,091,745

VALVE

James H. Webb, Montreal West, Quebec, Canada, assignor to Jenkins Bros., Jersey City, N. J., a corporation of New Jersey Application March 23, 1936, Serial No. 70,178
In Canada January 31, 1936

3 Claims. (Cl. 251—156)

This invention relates to improvements in valves and more particularly to improvements in iron bodied inside rising stem valves.

The primary object of the invention is to provide a valve of the above type having an inserted internally threaded bushing of bronze or other suitable metal for operative engagement with the valve stem.

A further object is to provide a valve as aforesaid in which the bushing and valve bonnet are so constructed that the bushing is readily renewable and is held against more than very limited movement in the longitudinal and circumferential directions of the stem by engagement with the valve bonnet and valve body.

A still further object is to provide a valve of the aforesaid character having provision for draining the bonnet.

Various other objects and the advantages of the invention may be ascertained from the following description and the accompanying drawings.

In the past, it has been proposed to insert bronze or other bushings in iron bodied inside rising stem valves but difficulty has been experienced in putting the proposals into practice without unduly increasing the cost of production. Further difficulties have been experienced in securing the bushing in place and for the most part the valve bonnet, especially above the bushing, has not been drained to permit unresisted rise of the stem on opening the valve and to avoid bursting of the bonnet by freezing of liquid trapped above the bushing.

The present invention consists, broadly speaking, in the provision of a valve having a separable bushing engaged between the valve body and bonnet and thereby held against movement longitudinally of the stem, the bushing having interengagement with either or both of said bonnet and body to be thereby held against rotation, the construction being such as to provide drainage passages connecting the interior portions of the bonnet above and below the bushing. In greater detail, the invention consists in the features and combinations of features disclosed in the following description or in the accompanying drawings, together with all such modifications thereof or substitutions therefor as are comprehended in the scope of the appended claims.

In the accompanying drawings which illustrate preferred embodiments of the invention but to the details of which the invention is not confined as modifications of detail are possible and contemplated;—

Fig. 1 is a central vertical longitudinal sectional view illustrating the application of the invention to a gate valve.

Fig. 2 is a vertical sectional view on the line 2—2 of Figure 1.

Figs. 3 and 4 are cross sectional views on the lines 3—3 and 4—4 respectively of Figure 1.

Fig. 5 is a side elevation of the bushing shown in previous figures.

Figs. 6 and 7 are fragmentary views corresponding respectively to Figs. 1 and 2 and illustrating a modified embodiment of the invention.

Figs. 8 and 9 are cross sectional views on the lines 8—8 and 9—9 respectively of Fig. 6.

Referring more particularly to the drawings and especially to Figures 1 to 5 thereof, 11 designates the body of a gate valve having a flow passage 12 therethrough and provided with facing seats 13 between which the closure member or gate 14 engages in the well known manner. The body is provided with an upward hollow extension 15 into which the gate may retreat when the valve is opened.

The valve is provided with a bonnet 16 which rests upon the upper end of the body extension 15 and is clamped thereto by a U-bolt 17 which passes under the body and extends through apertured lugs 18 on the bonnet. Nuts 19 are provided on the ends of the U-bolt above the bonnet lugs 18 to clamp the bonnet securely in place. The lower end of the bonnet is checked into the top of the body extension, as shown at 20, for the purpose of positioning the bonnet relatively to the body and of holding an interposed gasket 21 from being blown out by pressure within the valve.

The valve is provided with a threaded stem 22 rotatably connected at its lower end to the valve gate 14 and passing at its upper end through a packed gland 23 provided at the upper end of the bonnet. The interior dimensions of the bonnet and of the body extension 15 are such that the threaded portion of the stem is spaced therefrom.

At the lower part of the bonnet, the interior is enlarged to provide a recess 24 in which is seated a separable bushing 25 of bronze or other suitable metal, which bushing is internally screw-threaded for co-operation with the threaded portion of the valve stem. The bonnet recess 24 is preferably generally cylindrical in form and the body of the bushing is preferably correspondingly cylindrical, so as to facilitate manufacture thereof. The upper end of the recess or enlargement 24 is defined by a downwardly facing shoulder 26 against which the upper end of the bushing 25 seats to hold the bushing against upward movement. At the lower part of the bonnet recess a pair of diametrically opposite laterally extending notches 27 are provided, into which project a pair of diametrically opposite lugs or wings 28 formed on the bushing to hold the bushing against rotation in the bonnet. These wings may, if desired, project downwardly below the bushing as shown, this depending upon the design of the valve. The lower ends of the wings are adapted to engage the upper end of the body extension so as to hold the bushing against downward movement in the valve.

It will be seen that the bushing forms a partition which separates the interior of the bonnet above the bushing from the interior of the valve below the bushing. The bonnet is provided with a pair of vertically extending channels 29, which extend from above to below the bushing and establish communication between the interior of the bonnet above the bushing and the interior of the valve below the bushing, so as to enable any liquid which may have passed the bushing to drain out into the interior of the body.

Referring now to the modification shown in Figures 6 to 8 inclusive in which the structure is essentially the same as that already described but of slightly different design to adapt it to valves of larger size, the clearly defined approximately cylindrical recess for reception of the bushing is absent. The bushing, designated 25ª, bears at its upper end against a shoulder 26ª provided on a rib 26ᵇ extending inwardly from the bonnet wall. The notch or notches 27ª for engagement with the bushing wings 28ª are formed in a rib 27ᵇ extending inwardly from the bonnet wall. Owing to the alterations in design to adapt the invention to valves of larger size, the bushing 25ª is placed farther up in the bonnet than shown in the preceding figures and the wings 28ª extend downwardly from the bushing into contact with the upper end of the body extension 15. Passages 29ª are formed through the flanges 26ᵇ and 27ᵇ to provide for drainage as previously described.

The provision of a bushing of non-corrodible metal held against longitudinal displacement and rotative movement enables the body and bonnet of the valve to be made of relatively cheap material such as cast iron, and the stem to be made of material such as steel without any danger of the stem becoming corroded and sticking, as might occur in the case of a steel stem threaded into an iron or steel part. The invention is not limited to use of bronze or other non-corrodible bushings nor to iron bodied valves as the bushing may be made of ferrous metal in the case of cheap valves or as is necessary in valves exposed to certain substances such as caustic solutions. Quite independently of other features, the provision of a readily removable bushing enables the same to be renewed at small cost when the threads are worn, thus providing a considerable economy over valves of conventional design which necessitate renewal of the entire bonnet. The form and arrangement of the bonnet and bushing are such that they may be manufactured at very low cost. The bonnet recesses for reception of the bushing and its wings may be readily cast with sufficient accuracy so that at the most a facing of the shoulder 26 or 26ª will be all the machine work required. Similarly, the bushing may be cast with sufficient accuracy so that facing of its upper end will be all the machine work required in addition to the usual internal threading. It is not necessary that the bushing be a snug fit in the bonnet and, in fact, it is desirable that it be a loose fit so as to permit of limited lateral movement sufficient to enable the stem to centre itself.

While the valve has been illustrated and described as having two diametrically opposite wings on the bushing engaging in diametrically opposite recesses in the bonnet and while the bonnet has been illustrated and described as having two diametrically opposite drainage passages, it will be understood that the number of wings, notches and passages may be either more or less than shown and described.

While the invention has been shown in its application to a gate valve, it will be understood it is not thus limited but may be employed in other types of inside rising stem valves or to non-rising spindle valves.

Having thus described my invention, what I claim is:—

1. A valve comprising a body having circumferentially spaced upwardly facing abutment surfaces, a bonnet secured to the body and having circumferentially spaced downwardly facing abutment surfaces in spaced relation above the abutment surfaces of the body, a threaded stem passing through the bonnet and out of contact therewith, an internally threaded separable bushing in the bonnet and co-operating with the threaded portion of the stem, and said bushing being in engagement with the abutment surfaces of the body and bonnet and thereby held against movement in the longitudinal direction of the stem, said bonnet being formed with notches spaced below the abutment surfaces thereof and said bushing including wings engaging in the bonnet notches thereby to hold the bushing against rotation within the bonnet, said bushing being spaced from the bonnet wall intermediate the abutment surfaces and intermediate the notches thereof and thereby forming fluid flow passages extending from above the bushing to below the bushing and forming a drainage channel connecting the interior of the bonnet above the bushing with the interior of the valve below the bushing.

2. A valve comprising a body having circumferentially spaced upwardly facing abutment surfaces, a bonnet secured to said body having a bore increasing in diameter in the lower portion thereof and having circumferentially spaced downwardly facing abutment surfaces above said lower bore portion, a threaded stem within said bonnet having the threaded portion thereof spaced from the bonnet, an internally threaded bushing located within the bonnet in contact with the downwardly facing abutment surfaces thereof and in operative engagement with the threaded portion of the stem, ribs formed on the interior of the bonnet in vertical alignment with the abutment surfaces of the body, wings on the bushing engaging said ribs to hold the bushing against rotation in the bonnet and engaging the upwardly facing abutment surfaces of the body, said bushing being radially spaced from the bonnet between the abutment surfaces thereof and between said ribs thereby to enable fluid flow from the interior of the bonnet above the bushing into the valve below the bushing.

3. A valve comprising a body having peripherally spaced upwardly facing abutment surfaces, a bonnet secured to said body and encircling said abutment surfaces, said bonnet having peripherally spaced downwardly facing abutment surfaces spaced above and in alignment with the abutment surfaces of the body, and notches beneath said downwardly facing surfaces, an externally threaded stem within said bonnet having the threaded portion thereof spaced from the bonnet, an internally threaded bushing within the bonnet spaced from the wall thereof between the downwardly facing abutment surfaces and engaging said downwardly facing abutment surfaces, depending wings on said bushing engaging in said notches and engaging said upwardly facing abutment surfaces and supporting the bushing body spaced above said last mentioned abutment surfaces, the spaces between said downwardly facing abutment surfaces and between the bushing and bonnet and between said upwardly facing abutment surfaces constituting fluid flow passages communicating the interior of the bonnet above the bushing with the interior of the valve below the bushing.

JAMES H. WEBB.